(12) United States Patent
Weier

(10) Patent No.: US 7,509,863 B2
(45) Date of Patent: Mar. 31, 2009

(54) MEASURING AND TESTING DEVICE INCORPORATING AN AIR GAUGE

(75) Inventor: Glenn R. Weier, Waterford, MI (US)

(73) Assignee: Metaldyne Company LLC, Plymouth, MI (US)

( * ) Notice: Subject to any disclaimer, the term of this patent is extended or adjusted under 35 U.S.C. 154(b) by 0 days.

(21) Appl. No.: 11/716,803

(22) Filed: Mar. 12, 2007

(65) Prior Publication Data

US 2007/0240324 A1 Oct. 18, 2007

Related U.S. Application Data

(60) Provisional application No. 60/781,597, filed on Mar. 10, 2006.

(51) Int. Cl.
*G01M 3/02* (2006.01)
(52) U.S. Cl. ............................................. 73/714; 73/37
(58) Field of Classification Search .................... 73/714, 73/37, 37.9
See application file for complete search history.

(56) References Cited

U.S. PATENT DOCUMENTS

| | | | | |
|---|---|---|---|---|
| 4,063,449 | A | * | 12/1977 | Griggs ........................ 73/37.5 |
| 4,704,896 | A | * | 11/1987 | Parsons ...................... 73/37.9 |
| 4,753,555 | A | * | 6/1988 | Thompson et al. .......... 408/1 R |
| 6,029,361 | A | * | 2/2000 | Newman ..................... 33/556 |
| 6,708,566 | B1 | | 3/2004 | Thompson et al. |

OTHER PUBLICATIONS

Int'l Search Report, Feb. 13, 2008, Metaldyne Company LLC.
Written Opinion, Feb. 13, 2008, Metaldyne Company LLC.

* cited by examiner

*Primary Examiner*—Andre J Allen
(74) *Attorney, Agent, or Firm*—Robert H. Earp, III; McDonald Hopkins LLC

(57) ABSTRACT

The present invention relates to a measuring and testing device incorporating an air gauge capable of measuring dimensional characteristics of a tapered bore of a component. The measuring and testing device has an actuator for moving the air gauge or the component relative to the other so that the measuring and testing device are capable of utilization in an inline process for manufacturing the component.

18 Claims, 5 Drawing Sheets

MEASURING AND TESTING DEVICE INCORPORATING AN AIR GAUGE

CROSS-REFERENCE TO RELATED APPLICATION

This application claims priority from U.S. Provisional Patent Application No. 60/781,597 entitled "TAPER HOLE PROCESS AIR GAUGE" filed on Mar. 10, 2006, which is hereby incorporated by reference in its entirety.

FIELD OF THE INVENTION

The present invention generally relates to a measuring and testing device, and more particularly, to an air gauge for measuring apertures and tapered bores in work pieces.

BACKGROUND OF THE INVENTION

Many types of components are manufactured or machined to certain, specific tolerances and geometries. Such components must be manufactured according to such specific production characteristics and subjected to quality review testing. Testing procedures that yield variations outside of the given tolerances identify manufacture or machining problems or errors. There are numerous testing apparatuses and procedures utilized to measure machined components.

In the automotive industry, for example, components are manufactured according to specific tolerances. One such component is a knuckle component for a knuckle-corner module assembly. The knuckle component is machined to produce a component having tapered bores of specified tolerances therethrough. After manufacture, the component must be tested to verify that the tapered bores are properly machined and acceptable for final assembly.

Such a testing process for the tapered bore has previously been performed by non-standard operators with hand-operated, mechanical taper gauges. For example, operators mechanically remove one part of every number, such as, one in every hundred parts to test the dimensions of the tapered bore. If the dimensions of one of the tapered bores is outside the tolerance limits, the manufacturing assembly line may be halted while additional parts are inspected and/or while the machining apparatus is tested to identify the problem. However, by the time such an error is located, numerous parts may be manufactured incorrectly. Therefore, there is a need in the industry to have an apparatus and process for testing a part efficiently and in an automated manner so as to improve product quality.

Moreover, in the use of mechanical taper gauges, human error frequently occurs. For example, a knuckle component has a plurality of holes or bores that require precise dimensions. The mechanically operated taper gauges frequently contact or scrape the surface of the bore, and, as a result, change the surface dimensions of the bore. Often, the mere contact between the surface of the bore and the taper gauge causes the bore dimensions to exceed tolerance limitations. Therefore, the use of such mechanically operate tapered gauges is not as reliable or efficient as needed. Furthermore, such tapered gauges cannot be efficiently incorporated into an in-line assembly manufacturing process. Therefore, there is a need in the industry to provide an air gauge capable of measuring and testing the dimensions of a bore without contacting the surfaces of the bore.

Known air gauges may have a nozzle having an aperture that dispenses air. The air gauge may determine the diameter of the bore by one of many known methods, such as, measuring the flow rate exiting the bore, measuring the pressure within the bore (by placing a plug at an end of the bore) or measuring the resistance to flow toward the surfaces surrounding the bore. The air gauge is typically implemented by an operator manually checking one of a number, such as, one in every one hundred parts to determine whether the bores of such parts are within a predetermined tolerance limit. However, there is a need in the industry to provide an in-line automated process for measuring bores in each and every part to improve the overall quality of the parts and manufacturing process.

Furthermore, known air gauges are only capable of measuring a single diameter within a given bore. Tapered bores having changing diameters throughout the length of the bores are not accurately measured by known air gauges. Therefore, there is a need in the industry for an apparatus capable of measuring tapered bores accurately, especially during an in-line manufacturing assembly.

SUMMARY OF THE INVENTION

The present invention relates to a measuring and testing device incorporating an air gauge. A nozzle having upper and lower air channels extends from a base of the air gauge. An actuator moves the actuator into a tapered bore of a component, such as, a knuckle component, without touching the surfaces of the tapered bore. The measuring and testing device has a flange face for determining that the component is in a proper position for measuring the tapered bore.

DETAILED DESCRIPTION OF THE INVENTION

It is known in the art that air gauges use pneumatic pressure and flow to measure and sort dimensional attributes. Air gauges can provide a high degree of speed and accuracy in high-volume production environments. Air gauges use changes in pressure or flow rates to measure dimensions and determine attributes. Such systems may use master restrictor jets, as well as additional adjustable bleeds or restrictions, to measure pressure changes and adjust for changes in air tooling. Such air gauge systems can have a high degree of sensitivity and versatility.

While the preferred embodiment of the invention is described herein with reference to the testing and measuring of automotive knuckle components having tapered bores, it should be evident that the air gauge system could be used with other type of components, whether automotive or otherwise, to measure other dimensional characteristics and accuracy of other apertures for other components.

Figure 1:
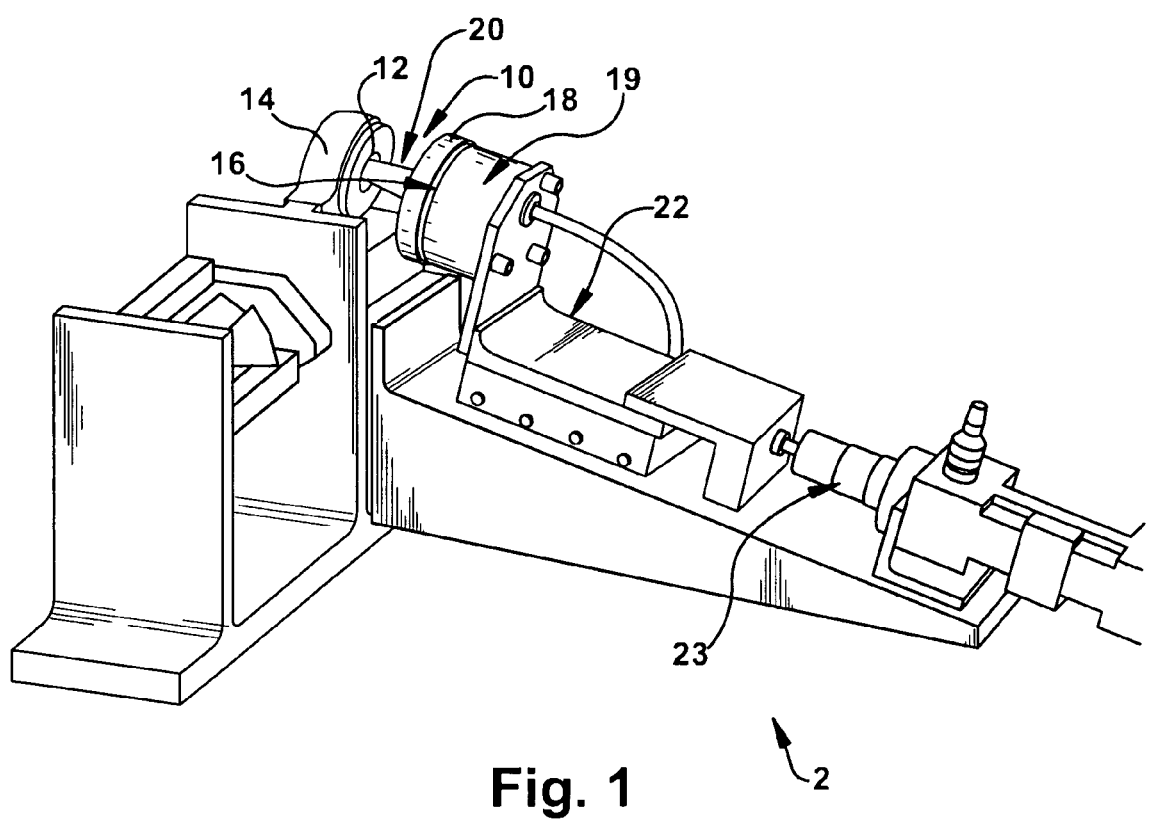
FIG. 1 illustrates a measuring and testing assembly in an embodiment of the present invention.

As shown in the accompanying drawings, a measuring and testing assembly 2 is generally illustrated in FIG. 1. The assembly 2 has an air gauge 10 for measuring the dimensions and configuration within a tapered bore 12 of a component 14. As best shown in FIG. 1, the air gauge 10 has a head 16 and a base 19. A nozzle 20 is positioned at the head 16 and is capable of being positioned within the tapered bore 12 of the component 14. Of course, the size and shape of the nozzle 20 may be modified to correspond in size and shape to the tapered bore 12.

Figure 2:
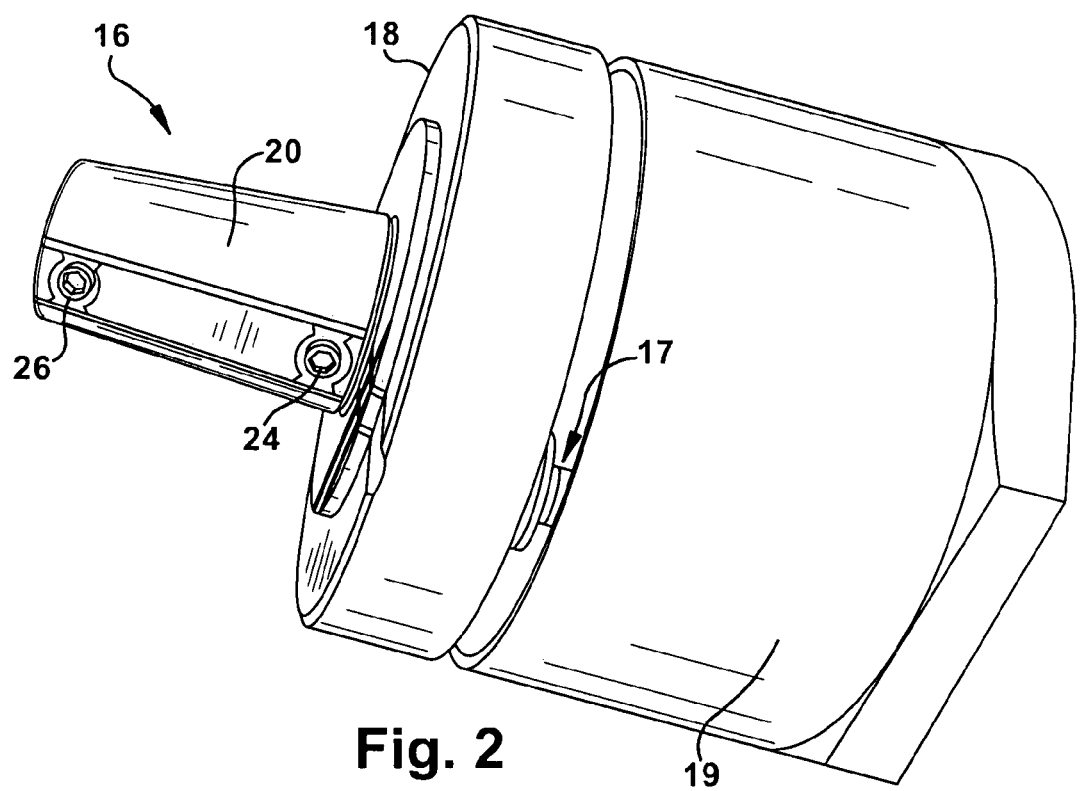
FIG. 2 is a side perspective view of an air gauge in an embodiment of the present invention.

A plate 18 is positioned adjacent to the base 19 of the air gauge 10 as illustrated in FIG. 2. The plate 18 floats angularly and radially with respect to the nozzle 20 and the base 19. A guide pin 17 is positioned between the base 19 and the nozzle 20. The guide pin 17 provides support to allow the plate 18 to float angularly and radially with respect to the nozzle 20 and the base 19. In a preferred embodiment, a plurality of the guide pins 17 are positioned between the plate 18 and the base 19.

The component 14 may be positioned on the nozzle 20 such that the nozzle 20 is located within the tapered bore 12. The component 14 may contact and/or may engage the plate 18. At such a position, the plate 18 may prevent contact between the component 14 and the base 19 of the air gauge 10. To this end, the plate 18 provides a cushion and shock absorber for preventing contact between the component 14 and the head 16.

Figure 3:
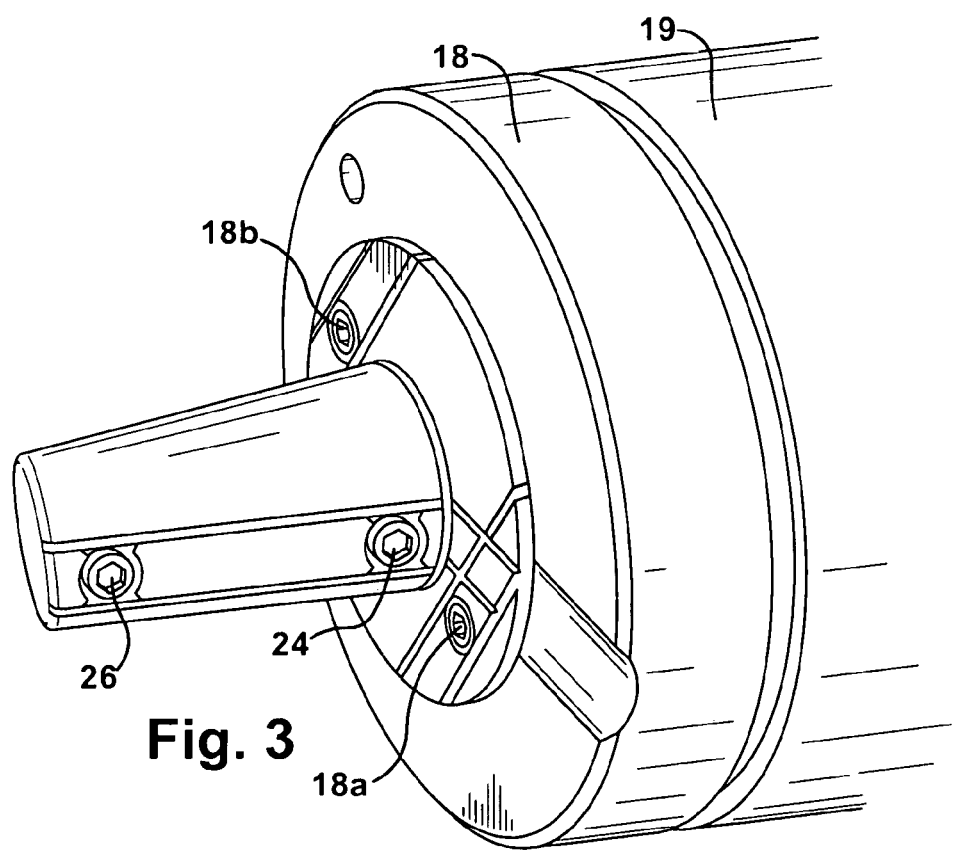
FIG. 3 is a top and side view of the air gauge of FIG. 2.

As illustrated in FIG. 3, the air gauge 10 may have air nozzles or channels 18a, 18b in the plate 18 for determining the location and/or flatness of the component 14 with respect to the plate 18. The air channels 18a, 18b may be incorporated into the air gauge 10. The air channels 18a, 18b may determine flatness of the component 14 relative to the plate 18 by, for example, determining air gap at each of the channels 18a, 18b. In one embodiment, the plate 18 may have a plurality of channels 18a, 18b positioned about the plate 18 for determining whether the component is properly positioned with respect to the nozzle 20. The channels 18a, 18b may output air to determine the distance the component 14 is from the plate 18. For example, the air gauge 10 may determine and/or may measure the resistance to the air flow from the channels 18a, 18b and correlate the resistance to a known distance. The relative position of the component 14 may be determined based on the distance of the component 14 from each of the channels 18a, 18b.

Figure 4A:
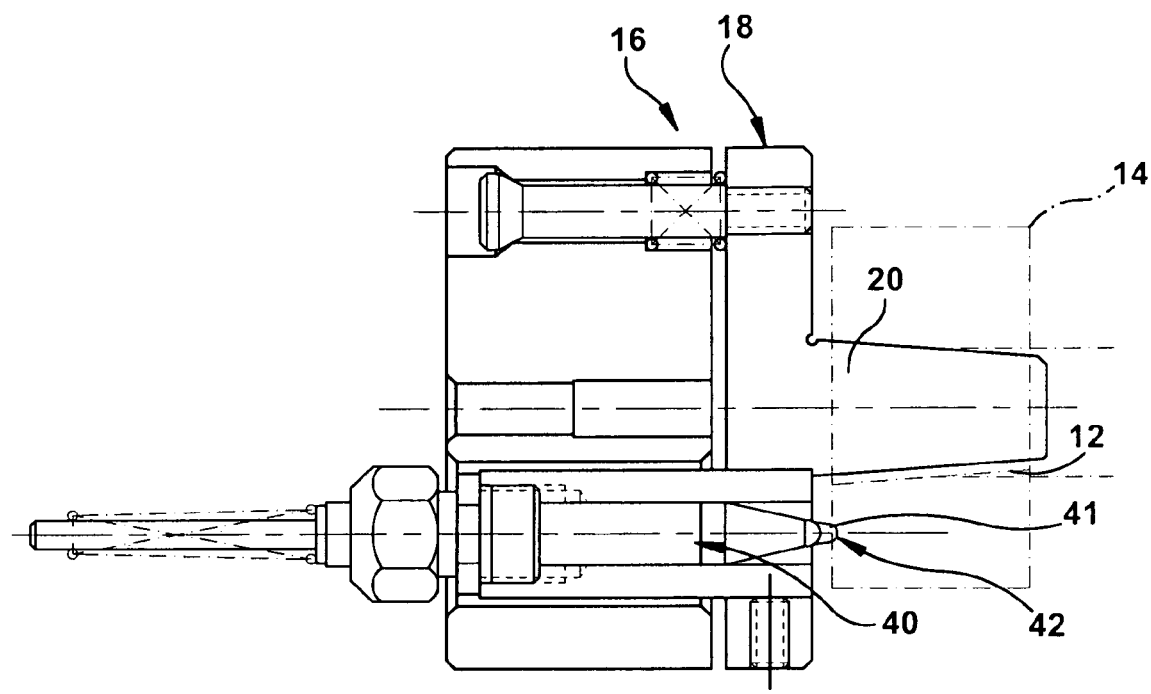
FIG. 4A is a schematic view of an alternate embodiment of an air gauge of the present invention.
Figure 4B:
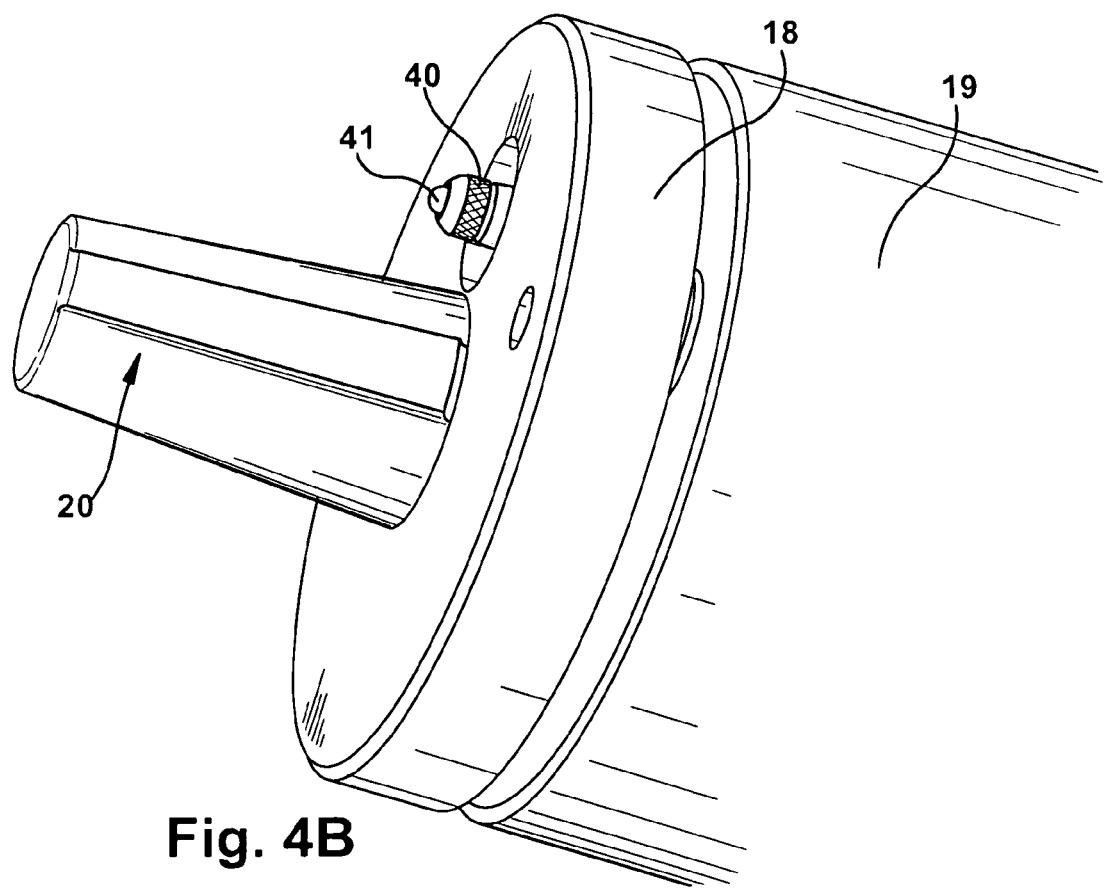
FIG. 4B is a side perspective view of the air gauge of FIG. 4A.
Figure 5:
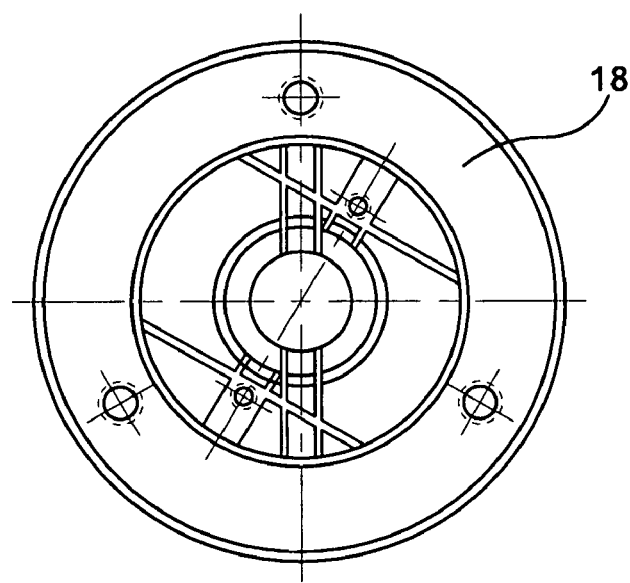
FIG. 5 is a diagrammatic top view of an air gauge in an embodiment of the present invention.
Figure 6:
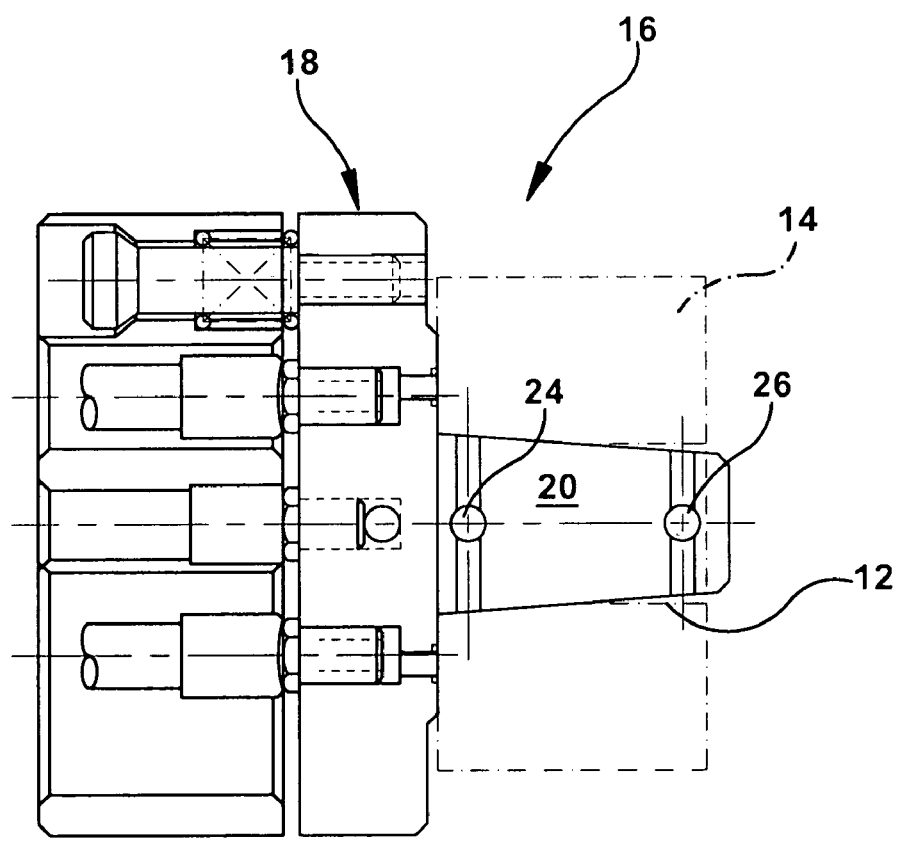
FIG. 6 is a diagrammatic side and cross-sectional view of an air gauge in an embodiment of the present invention.

FIGS. 4A and 4B illustrate a detector 40 for measuring linear displacement of the component 14. The detector 40 may be, for example, a linear variable displacement transducer ("LVDT"), a laser, a sensor capable of measuring distance and/or position, and/or other devices capable of measuring lateral distance and/or angular position. The detector 40 may determine the proper position of the component 14 relative to the plate 18 and the base 19. In one embodiment, the detector 40 may only determine the lateral distance between the plate 18 and the component 14. The lateral distance may be a predetermined distance where the component 14 is parallel to the plate 18 or otherwise properly positioned for testing by the air gauge 10. In an embodiment, a plurality of detectors 40 may be positioned about the plate 18. Each of the detectors 40 may determine a lateral distance of the component 14 from the plate 18 to determine whether the component 14 is seated or otherwise properly positioned with respect to the air gauge 10.

The detector 40 may have an armature 41 protruding from the plate 18, as illustrated in FIGS. 4A and 4B. The armature 41 may contact and/or may abut the component 14 as illustrated in FIG. 4A. Positioning the component 14 on the nozzle 20 may contact the armature 41 and move the armature 41 to determine the relative position of the component 14. The detector 40 should not be deemed as limited to any specific device or assembly for determining the lateral displacement and/or the flatness of the component 14 relative to the plate 18. The detector 40 may be any sensor, transducer or other device capable of determining lateral and/or angular position of the component 14.

The base 19 is connected to an actuator 22 that positions the base 19 and the nozzle 20 in a position to measure the dimensions of the tapered bore 12 as illustrated in FIG. 1. For example, the actuator 22 laterally moves the base 19 and the nozzle 20 toward and away from the component 14. The actuator 22 may have a piston 23 for moving the base 19 of the air gauge 10. Therefore, the actuator 22 moves the nozzle 20 into position relative to the component 14 for measurement. The actuator 22 is capable of performing the procedure or process repeatedly so as to be utilized as an in-line testing procedure. Alternatively, the actuator 22 may move the component 14 relative to the air gauge 10 and the nozzle 20.

The actuator 22 moves the air gauge 10 to a position such that the plate 18 is positioned between the component 14 and the base 19. In an embodiment, moving the base 19 causes the plate 18 to be parallel to the surface of the component 14. In an instance where the component 14 contacts the plate 18, the plate 18 will absorb the force of the component 14 without causing movement of the base 19. To this end, the base 19 may remain stationary even if the component 14 contacts and abuts the plate 18. In a preferred embodiment, the actuator 22 moves the base 19 such that the plate 18 nearly contacts the component 14.

As described above, the plate 18 and the nozzle 20 may "float" and not contact the component 14 so as not to influence the air gauge readings. The guide pins 17 may have, for example, springs to impose nominal force to position the nozzle 20 while not influencing the reading of the air gauge 10. The actuator 22 is designed to position and "seat" the plate 18 against or at least substantially close to the machined face of the component 14.

The nozzle 20 has an upper passage 24 and a lower passage 26. The upper passage 24 may be located adjacent the plate 18. The upper passage 24 and the lower passage 26 may be channels formed in the nozzle 20 for providing fluid, such as, air therethrough. In an embodiment, the upper passage 24 may be a pair of opposing passages located on the nozzle 20 and the lower passage 26 may be a pair of opposing passages on the nozzle 20. Accordingly, in such an embodiment, there are four air gauge passages 24, 26 on the nozzle 20 used to evaluate the profile of the tapered bore 12. The nozzle 20 may have any number of passages 24, 26 as will be appreciated by one of ordinary skill in the art.

Airflow may be provided through the upper passages 24 and the lower passages 26 to independently evaluate taper form, size, and position of the tapered bore 12. In an embodiment, air is forced, pumped or otherwise output through the passages 24, 26. Air from the passages 24, 26 contacts the surface of the tapered bore 12. The surface of the tapered bore 12 resists the flow of air from the passages 24, 26. The resistance to the air flow increases as the passages 24, 26 are positioned in closer proximity to the surface of the tapered bore 12. The air gauge 10 may monitor, may measure or may determine the resistance to the air flow. The amount of resistance to the airflow may be used to determine the dimensions of the tapered bore 12.

In use, the component 14 may be removed from an inline process for manufacturing the component 14 or other inline process related to the. The component 14 may be positioned at the measuring and testing assembly 2. For example, a robotic arm may remove the component 14 from the inline process, such as from an assembly line and position the component 14 relative to the air gauge 10. The actuator 22 may move the base 19 and the nozzle 20 of the air gauge 10 into the tapered bore 12. The detector 40 and/or the channels 18a, 18b may communicate with the actuator 22 to properly position the nozzle 20 such that the nozzle 20 extends into the tapered bore 12 without touching the surface of the tapered bore 12. For example, at a predetermined distance from the plate 18, the detector 40 and/or the channels 18a, 18b may terminate movement of the actuator 22.

The air gauge 10 may utilize the passages 24, 26 to determine the dimensional characteristics of the tapered bore 12, such as, the depth of the tapered bore 12 and diameters of the tapered bore 12 at preset and/or various locations along the length of the tapered bore 12. In an embodiment, the air gauge 10 may determine the dimensions of the tapered bore 12 based on the diameter at the upper passages 24 and the lower passages 26. The air gauge 10 may verify that the dimensions of the tapered bore 12 are within predetermined tolerance limits.

If the dimensions of the tapered bore 12 are within the predetermined tolerance limits, the component 14 may be returned to the inline process or machining assembly. If the dimensions exceed the predetermined tolerance limits, the assembly may be halted or other procedures may be undertaken to ensure other parts are manufactured correctly. In an embodiment, the measuring and testing assembly 2 may monitor the dimensions of the tapered bore 12 over time to determine problems within the inline manufacturing assembly that may occur in the future. For example, the measuring and testing assembly 2 may determine that the dimensions of each of the tapered bores 12 is continually increasing such that the diameter of the tapered bores 12 will likely exceed the predetermined tolerance limitations if the manufacturing assembly is not adjusted. As a result, an operator, for example, may be notified to identify and resolve the potential problem.

Figure 8:
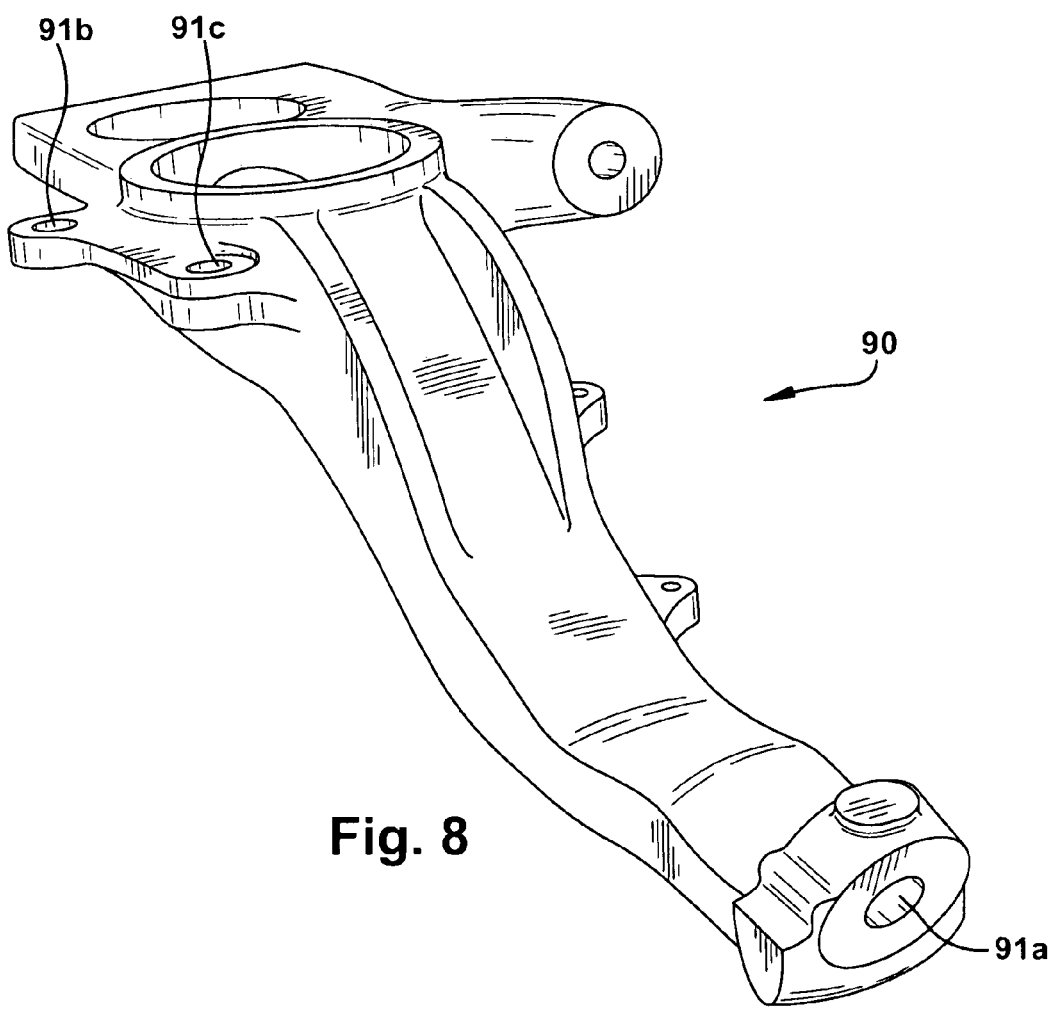
FIG. 8 illustrates a knuckle component having tapered bores in an embodiment of the present invention.

In an embodiment, the component 14 may be an automotive component, such as, a knuckle component 90 as illustrated in FIG. 8. The knuckle component 90 may have tapered bores 91a-91c. The measuring and testing assembly 2 may have an equal number of the air gauges 10 as the tapered bores 91a-91c, such as three in the embodiment as shown. In such an embodiment, each of the air gauges 10 may determine the dimensions and accuracy of each of the tapered bores 91a-91c to verify the part has been properly manufactured.

Figure 7:
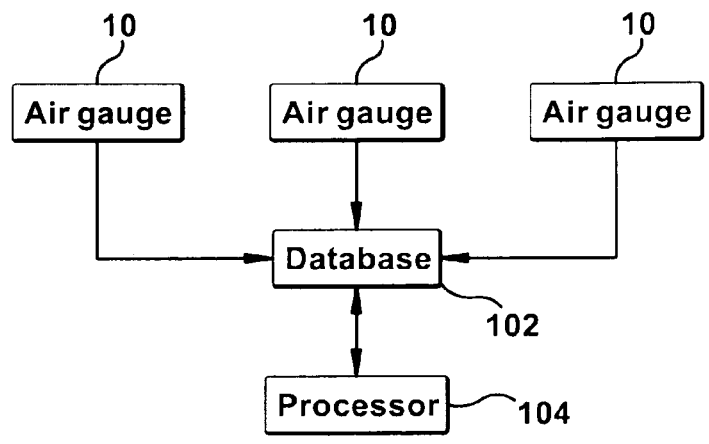
FIG. 7 is a box diagram of a plurality of air gauges in communication with a database in an embodiment of the present invention.

FIG. 7 illustrates a box diagram of a measuring and testing assembly 100 having three air gauges 10 in an embodiment of the present invention. Of course, any number of air gauges 10 may be used and/or incorporated into the measuring and testing assembly 100. The air gauges 10 may be in communication with a database 102 and/or a processor 104. The database 102 may be remote with respect to the air gauge 10. A processor 104 may be in communication with the database 102 and/or the air gauges 10.

The database 102 may store information and/or data related to each of the tapered bores 91a-91c. For example, the database 102 may store the signals and/or information received from each of the air gauges 10, which may be converted to dimensional characteristics of the tapered bores 91a-91c by the processor 104 and/or software on the database 102. Alternatively, the air gauges 10 may convert the resistance to air flow, flow rate or other measurement related to air flow within the tapered bores 91a-91c to dimensional data and/or characteristics prior to transmission to the database 102.

Furthermore, the database 102 may store data and/or information related to dimensions of a predetermined, selected or master tapered bore. In addition, the database 102 may store information and/or data related to the predetermined tolerance limitations related to the tapered bores 91a-91c along with the predetermined tolerance limitations. The processor 104 and/or the database 102 may compare the dimensional characteristics of the ideal tapered bore to the dimensional characteristics of each of the tapered bores 91a-91c. The measuring and testing assembly 100 may then verify the knuckle component 90 or, alternatively, may indicate that the knuckle component 90 has failed and remove the knuckle component 90 from the inline system, process or assembly. To this end, the measuring and testing assembly 100 allows the tapered bores 91a-91c of a plurality of knuckle components 90 to be measured and tested in an inline process.

The detector 40 and/or the channels 18a, 18b may transmit information, signals and/or data related to the position of the machined faces of the knuckle component 90 with respect to each of the plates 18 of the air gauges 10 to the database 102. The information and the data from the detector 40 and/or the channels 18a, 18b may be correlated, converted and/or transformed into lateral distance to or from the plate 18, horizontal and/or vertical orientation with respect to the plate 18 and/or flatness of the machined face of the knuckle component 90 with respect to the plate 18.

The database 102 may store information and/or data related to an ideal position of the knuckle component 90 with respect to the plate 18 of the air gauge 10. For example, the database 102 may store information regarding the distance the machined face of the knuckle component 90 is ideally located from the plate 18. Further, the database 102 may store data and/or information related to the proper and ideal orientation of each face of each of the tapered bores 91a-91c. Such information may include tolerance limitations or ranges.

The orientation information may be used to control the actuators 22 to move each of the air gauges 10 with respect to the knuckle component 90. For example, at a predetermined distance from the plate 18, the detector 40 and/or the channels 18a, 18b may terminate movement of the actuator 22. Accordingly, the actuator 22 may position the air gauges 10 within the tapered bores 91a-91c, and the detector 40 and/or the channels 18a, 18b may ensure flatness and positional accuracy of the air gauge 10.

The actuators 22 may properly position the nozzles 20 such that the nozzles 20 extend into the tapered bores 91a-91c without touching the surface of the tapered bores 91a-91c. Advantageously, measuring and testing each of the tapered bores 91a-91c allows the measuring and assembly 100 to determine the relative position of the knuckle component 90 with respect to the assembly 100. For example, if one side of the passages 24, 26 of each of the air gauges 10 are located a similar distance too close to the surface of the tapered bores 91a-91c and the opposite side of the passages 24, 26 are located the same similar distance too far from the surface of the tapered bores 91a-91c, then the measuring and testing assembly 100 may determine that the knuckle component 90 is merely off-center. To this end, the passages 24, 26 have the ability to "comp" and look for a net air passage by nullifying any slight miss alignment in the radial positioning of the knuckle component 90.

Therefore, the measuring and testing assembly 100 may provide a production-quality, in-line device for evaluating tapered bore dimensions or locations against specified tolerances. The air gauge 10 may provide additional comparative or quantitative measurements as required.

While the invention has been described with reference to the preferred embodiment, other modification and design changes can be appreciated upon reading the disclosure along with the accompany drawings. As such, nothing in the present description should be implied to limit the invention from what is claimed below.

The invention claimed is:

1. A measuring and testing device for tapered bores of components, the measuring and testing device:
   an air gauge having a nozzle capable of determining dimensional characteristics of a tapered bore of a component; and
   a detector capable of determining the position of the tapered bore relative to the nozzle wherein the detector is incorporated into an inline process for manufacturing the component, and further wherein the air gauge determines the dimensional characteristics of the tapered bore without contacting peripheral walls defining the tapered bore.

2. The measuring and testing device of claim 1 wherein the detector comprises two air gauge channels.

3. The measuring and testing device of claim 1 wherein the detector is a linear variable displacement transducer.

4. The measuring and testing device of claim 1 wherein the nozzle has a shape and size corresponding to the dimensional characteristics of the tapered bore.

5. The measuring and testing device of claim 1 wherein the nozzle has a plurality of passageways formed in the nozzle for outputting air from the passageways toward the peripheral walls of the tapered bore.

6. The measuring and testing device of claim 4 wherein the air gauge determines the resistance to air flow from the passageways.

7. The measuring and testing device of claim 5 further comprising:
   a database in communication with the air gauge, the database storing information related to dimensional characteristics of a predetermined tapered bore.

8. The measuring and testing device of claim 7 wherein the database compares the dimensional characteristics of the predetermined tapered bore to the dimensional characteristics of the tapered bore determined from the air gauge.

9. A measuring and testing device comprising:
   an air gauge having a nozzle capable of measuring dimensional characteristics of a tapered bore of a component without contacting peripheral walls of the tapered bore;
   an actuator capable of moving the nozzle or the component relative to the other; and
   a database in communication with the air gauge, the database storing information related to a predetermined dimensional characteristic of the tapered bore, wherein the predetermined dimensional characteristic is compared to the dimensional characteristic measured by the air gauge.

10. The measuring and testing device of claim 9 wherein the actuator moves the component relative to the nozzle.

11. The measuring and testing device of claim 9 wherein the actuator moves the nozzle relative to the component.

12. The measuring and testing device of claim 9 wherein the nozzle has a pair of upper passages and a pair of lower passages for providing air therethrough.

13. The measuring and testing device of claim 9 wherein the actuator is incorporated into an inline process for manufacturing the component.

14. The measuring and testing device of claim 11 wherein the air gauge determines resistance to air flow from the nozzle.

15. The measuring and testing device of claim 14 wherein the resistance to air flow is used to determine the dimensional characteristics of the tapered bore.

16. The measuring and testing device of claim 15 wherein the component is removed from the inline process if the dimensional characteristics do not correspond to the predetermined dimensional characteristics of the tapered bore.

17. A method of measuring the dimensions of a tapered bore of a component, the method comprising the steps of:
   positioning an air gauge or the component such that the air gauge is capable of measuring dimensional characteristics of the tapered bore;
   determining the dimensional characteristics of the tapered bore;
   comparing the dimensional characteristics of the tapered bore to predetermined dimensional characteristics of the tapered bore; and
   determining whether the tapered bore of the component is within selected tolerance limits of the predetermined dimensional characteristics of the tapered bore.

18. The method of claim 17 wherein the component is a knuckle component for a knuckle-corner module assembly.

* * * * *